No. 646,344. Patented Mar. 27, 1900.
S. G. BALDWIN.
INK WELL.
(Application filed July 20, 1898.)
(No Model.)

WITNESSES
F. C. Barry
M. F. Haskell

INVENTOR
S. G. Baldwin
BY
O. E. Duffy
ATTORNEY.

UNITED STATES PATENT OFFICE.

STEPHEN G. BALDWIN, OF MARION, INDIANA.

INK-WELL.

SPECIFICATION forming part of Letters Patent No. 646,344, dated March 27, 1900.

Application filed July 20, 1898. Serial No. 686,407. (No model.)

*To all whom it may concern:*

Be it known that I, STEPHEN G. BALDWIN, of Marion, in the county of Grant and State of Indiana, have invented certain new and useful Improvements in Ink-Wells; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to certain new and useful improvements in ink-wells, and has for its objects simplicity, durability, and cheapness of construction and efficiency in operation, with great economy and saving of ink.

A further object of the invention is to provide an ink-well with a removable internal dip adapted to receive and hold a sufficient quantity of ink and at the same time form a trap and seal to prevent air from entering the body of the well.

A further object of the invention is to provide an ink-well with an inverted conical-shaped pen-opening the plane of the lower edges of which is below the plane of the upper edges of the internal dip, which when the dip is full of ink forms a trap for foreign substances and also a seal, and the walls of the conical pen-opening form deflectors or guides for the ink into the dip.

A further object of the invention is to provide an ink-well having an internal dip that may be easily and quickly filled by a slight upward motion of the well, the ink deflecting from the wall of the conical pen-opening into the dip, which is located directly thereunder.

A further object of the invention is to provide an ink-well with a removable internal dip that may be filled with ink by tilting the well and that can also be removed through the bottom of the well for cleaning both the dip and the well, the opening in the bottom being sufficiently large for that purpose.

This invention consists of certain novel features of construction and in combinations of parts, more fully described hereinafter and particularly pointed out in the claims.

Figure 1:
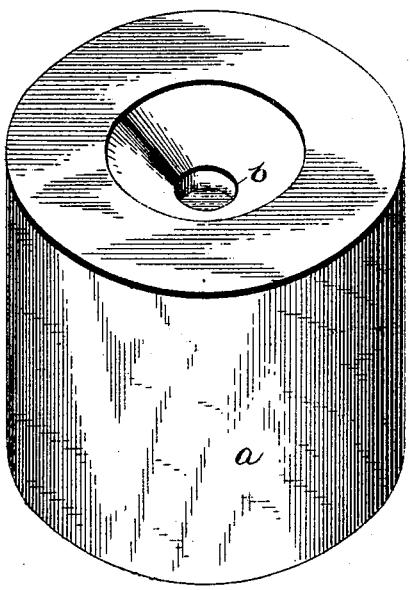
Figure 3:
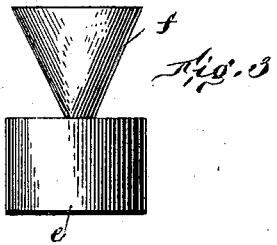
Figure 2:
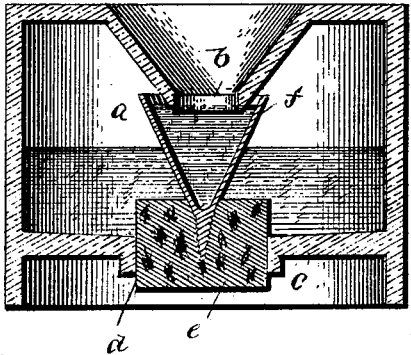

In the accompanying drawings, Figure 1 is a perspective view of my improved ink-well in operation. Fig. 2 is a vertical central section. Fig. 3 is a detail view of the removable dip.

Referring by letter to the accompanying drawings, $a$ is the body of the well, having the conical depending pen-opening $b$ in the top thereof.

$c$ is the bottom of the well, preferably formed integral therewith, having the opening $d$ directly under the pen-opening, and is adapted to receive and be tightly closed by a suitable closure or stopper $e$, which carries the dip $f$.

The cylindrical body of the ink-well extends considerably below the bottom, so as to form a base or stand. This bottom may be sufficiently thick to form a long bearing for the stopple, or a flange may be formed extending below the bottom of the opening $d$, which may be formed integral with the bottom. This flange or enlarged bearing is essential to the cork or stopple to prevent leakage. The bottom being so far above the lower edge of the body prevents the stopple from touching the table on which the ink-well stands.

The opening $d$ and the stopple may be made to tightly fit by a ground-joint in the glass; but if the stopple is made of flexible substance should the dip $f$ break a new one may be substituted, thus saving the ink-well.

The pen-opening $b$ is formed with the stopple-opening $d$ in the bottom always directly beneath it carrying the dip $f$, which is adapted to receive and hold the desired quantity of ink for the consumer's use and enough to fill the dip sufficiently full to submerge the lower edge of the depending pen-opening $b$, thus forming a trap and seal for the prevention of air to the body of the well and the consequent waste of ink by evaporation. Should, however, the ink in the dip evaporate, the opening from the body of the well to the outer atmosphere between the pen-opening and the dip is so slight that without agitation the evaporation would be practically nothing.

When it is desired to fill the dip $f$, a slight quick upward motion of the well will throw the ink against the inner side of the top of the well, where the depending pen-opening will guide it to the dip-well and at the same time prevent spilling.

The dip $f$ being carried by the closure of stopper e, it is readily removed for cleaning purposes, the opening d being large enough to allow the dip to freely pass into and out of the body of the well.

Should it be desired to withdraw the dip from the well while it contains ink, simply turn the well on its side, withdraw the dip without fear of spilling, and set the well down until the dip is replaced, when the well can be turned up to its proper position.

The well may be made of any desired contour, square or with flat sides, and other changes may be made in the forms, arrangements, and construction of the parts described without departing from the scope of my invention. Hence I do not wish to limit myself to the exact construction herein set forth, but consider myself entitled to all such changes.

Having thus fully described my invention, what I claim, and desire to secure by Letters Patent of the United States, is—

1. An ink-well comprising the body having a depending pen-opening, an opening in the bottom of said well and a closure for said opening carrying a dip-well, as and for the purpose set forth.

2. An ink-well comprising the body, a depending pen-opening formed in the top thereof, an opening in the bottom of said well, a removable closure or stopper for said opening and a dip-well carried by said closure or stopper directly under said pen-opening, the said pen-opening and dip being arranged to extend one into the other having a space between them to receive a supply of ink from the body of the well by a slight upward throw or tilt of the well, substantially as described.

3. An ink-well having an inverted conical opening in its top, the bottom having an opening directly beneath said conical opening, said bottom being considerably above the outer edges of the body of the well, and the opening thereof having a bearing or flange wider than the bottom is thick, a stopple in said flanged opening and a dip-well carried by said stopple, substantially as described.

In testimony that I claim the foregoing as my own I affix my signature in presence of two witnesses.

STEPHEN G. BALDWIN.

Witnesses:
W. B. ALEXANDER,
A. R. SMITH.